Figure 1:
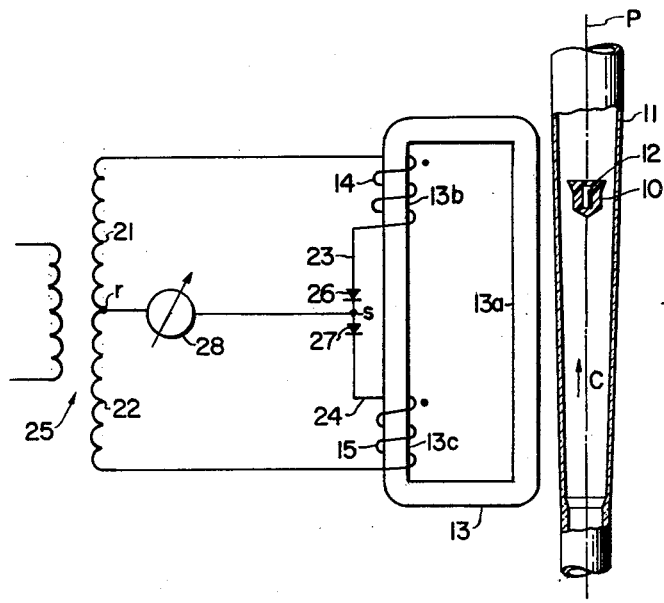

April 14, 1964     H. F. HEINEMAN     3,128,625

SATURABLE REACTOR POSITION TRANSDUCER

Filed May 14, 1962

INVENTOR.
Henry F. Heineman

United States Patent Office 3,128,625
Patented Apr. 14, 1964

3,128,625
SATURABLE REACTOR POSITION TRANSDUCER
Henry F. Heineman, 841 Valley View Road,
Pittsburgh 16, Pa.
Filed May 14, 1962, Ser. No. 194,279
7 Claims. (Cl. 73—209)

This invention relates to improved mechanical-electrical position signal transducers employing saturable reactors as principal components thereof and more specifically to fluid-condition-sensing apparatus employing such improved transducers.

This is a continuation-in-part of my co-pending application entitled Fluid Indicator, Serial No. 749,276, which was filed on July 17, 1958, and is now abandoned.

The increased use of automatic industrial controls and centralized control stations for industrial processes, has developed a great demand for compact, rugged, sensitive and inexpensive mechanical-electrical transducers for converting information in the form of the physical position or location of an object into the form of a transmittable electrical signal. Servomotors, rotameters, liquid level sensing devices, and hydrometers are typical examples of devices which yield information in the form of the physical position of a mechanical object. The problems of providing a satisfactory transducer are especially difficult where the object is inaccessible due to its being completely enclosed or isolated, as in the case of rotameters, liquid level sensing devices, and hydrometers.

In the past, mechanical-electrical position transducers have employed magnetic followers, complicated systems of point contacts and variable reluctance devices. These prior transducers have not been completely satisfactory, especially when applied to an enclosed-object type condition responsive device, since they are complicated, expensive to construct, lack the necessary high degree of accuracy and sensitivity, unduly interfere with the condition responsive device, itself, and are particularly vulnerable to hazards incident to industrial locations such as shock, vibration and the accumulation of dirt. Furthermore, prior mechanical-electrical position transducers operate primarily by varying the load on an electrical circuit and are thereby inherently inefficient, costly to operate and will produce a relatively small output signal. As one of the reasons for providing a mechanical-electrical transducer is to create a signal that may be readily transmitted over large distances, an inefficient signal producing means will undesirably require the use of amplifiers and the like to compensate for its inherent failure.

Accordingly, it has been an object of my invention to provide an improved mechanical-electrical position transducer employing magnetic amplifier principles to produce an accurate, sensitive and readily transmittable electrical output signal;

Another object of my invention has been to provide a compact, simple, and ruggedly constructed mechanical-electrical position transducer;

Another object of my invention has been to provide an improved mechanical-electrical position transducer having an inherently efficient operation and producing an inherently large output signal to thus minimize the necessity of further signal amplification for purposes of long distance signal transmission;

Another important object of my invention has been to provide an improved fluid-condition-sensing apparatus having a completely-enclosed condition-responsive float and producing an accurate, sensitive and readily transmittable, electrical output signal as a function indicative of the condition sensed;

A further object of my invention has been to provide an improved mechanical-electrical transducer for converting information as to the physical position of a variably positioned object into an electrical signal without interfering with the variable positioning operation of the object.

Figure 2:
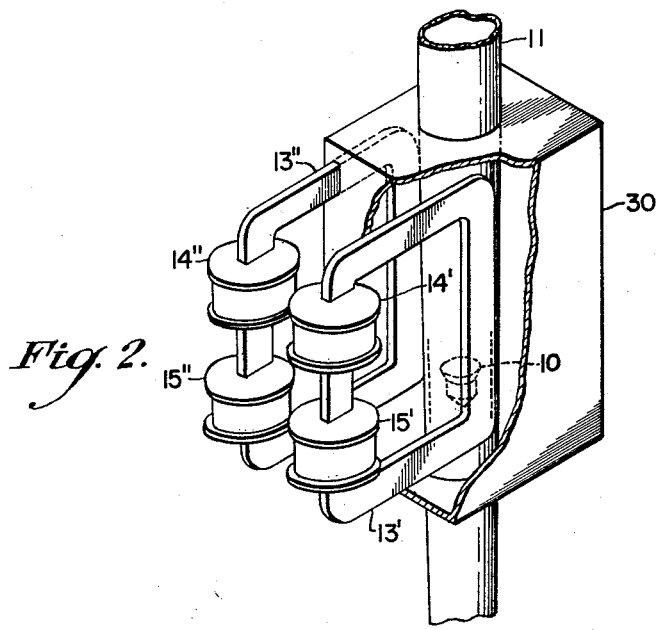

These and other objects of my invention will be apparent to those skilled in the art upon reading and understanding the following description wherein specific reference is made to the accompanying drawings, of which:

FIGURE 1 is a somewhat diagrammatic elevation, partly in cross-section, showing a preferred embodiment of my mechanical-electrical position transducer in combination with a rotameter-type fluid flow measuring device; and FIGURE 2 is a partially broken-away perspective view of elements employed in my transducer as operatively assembled with a rotameter.

An important novel concept involved in my invention relates to my discovery that the location of a magnetic flux source can be determined by detecting the differential effect of that source on two effectively-spaced gate windings associated with one or more saturable reactor elements. More particularly, I have discovered that such gate windings, when suitably oriented adjacent opposite ends of a path upon which the magnetic flux source is movably positioned, will be differentially affected by the position of the source along the path. I have also discovered that this differential effect can easily be detected by suitably constructed magnetic amplifier circuitry to produce a relatively linear and sensitive output signal.

Another important novel concept involved in my invention relates to the use of a saturable reactor element including a single core member having a portion that extends substantially parallel to the path of a movable magnetic flux source and having a pair of gate windings effectively positioned adjacent opposite ends of the path. I have discovered that the core portion of such a reactor element will concentrate the flux field of the gate windings and flux source in a regular fashion along the path and thereby increase the magnitude and linearity of the differential effect produced by the movable flux source. I have determined that by employing a continuous core member upon which the gate windings are mounted, an effective conduit for the magnetic flux will be provided to permit the construction of an especially compact assembly that can be readily incorporated into many existing structural devices requiring mechanical-electrical transducers. I have also discovered that the use of a continuous core member will substantially increase the sensitivity of the transducer.

I have conceived of the particular utility of my novel transducer in combination with enclose float-type sensing devices, such as rotameters, liquid level sensors and hydrometers. This results from the fact that my transducer does not require any moving parts, other than a small permanent magnet that can be readily incorporated into a movable sensing element, itself, and that does not require any direct mechanical linkage with the sensing element.

My transducer operates on the current control principle of magnetic amplifiers and, therefore, is inherently more efficient than variable reluctance devices which operate on a variable load principle.

Referring now more specifically to the drawings, FIGURE 1 shows my mechanical-electrical transducer in combination with a rotameter-type fluid flow sensing device. A float, rotor, condition-responsive element, or object 10 is located within an elongated tube, flow conduit, or enclosure 11 that conducts an upwardly-moving fluid current C. The tube 11 and float 10 are designed according to known principles of fluid dynamics, whereby the float 10 will assume a position along a path P extending longitudinally of the tube 11, as a function of the flow rate of current C. Generally speaking, the tube 11 is constructed of a non-magnetic material and is tapered to provide an upwardly enlarging cross-sectional area, and the float 10 is constructed of a non-magnetic material of a greater density than the fluid of current C. A permanent magnet or magnetic flux source 12 having a polar axis that is substantially parallel to the path P, is embedded in or otherwise mounted or connected for movement with the float 10.

A saturable reactor element comprising a continuous closed-loop magnetically saturable core member or flux conduit 13 and a pair of effectively-spaced gate windings or coils 14 and 15, is located adjacent the path P. The member 13 may be of a suitable material such as Mumetal. The core member 13 has a first or forward portion 13a located adjacent the tube 11 within the magnetic field of the magnet 12 and that is oriented substantially parallel to the path P. The core member 13 also has rearward second and third portions 13b and 13c upon which the gate windings 14 and 15 are respectively mounted. The gate windings 14 and 15 are positioned one above the other, so that the gate winding 14 is located adjacent the upper end of the core member 13 and the gate winding 15 is located adjacent the lower end of the core member 13. Due to the core member 13, the gate windings, when so positioned, are effectively located adjacent opposite ends of the path P. The gate windings 14 and 15 are wound to have the same polarity when energized, which polarity may be the same or different from the polarity of magnet 12.

The saturable reactor element is incorporated into a bridge-like circuit or differential current detecting means for producing an electrical output signal as a function of the algebraic difference between the firing angles of the gate windings 14 and 15, to thereby respond to the asymmetrical magnetizing effect on the core member 13 resulting from the position of the magnet 12. The bridge-like circuit shown is merely illustrative of many differential detectors capable of performing these functions.

The circuit includes first and second legs 21 and 22 having a pair of equal voltage supply means provided by a center-tapped transformer 25, a third leg 23 that includes the gate winding 14 and a rectifier 26, a fourth leg 24 that includes the gate winding 15 and a rectifier 27, and an output connection that is taken across a reference point r between the first and second legs 21 and 22 and a null or signal point s that is taken between the third and fourth legs 23 and 24. For purposes of illustration, the output connections are applied to a galvanometer 28 that will respond to both the magnitude and direction of the electrical current flow therethrough; however, it will be apparent that many electrical components, such as recorders or controllers, can be operated by the output signal in place of the galvanometer 28.

The third and fourth legs 23 and 24 of the circuit will each conduct a current as a function of the firing angles associated with gate windings 14 and 15, according to known principles of saturable reactor operation. As this conductance or lack of conductance results from a periodical switch-like operation of the gate windings 14 and 15, the gate windings, themselves, will impose only a minimal load on the circuit. It is thus to be emphasized that the gate windings 14 and 15 do not vary the load in their respective legs 23 and 24 to any substantial extent.

The bridge-like circuit will tend to conduct current flow in the direction of the rectifiers 26 and 27 during one-half of the alternating supply voltage cycle provided by the transformer 25. When the magnet 12 is positioned equidistantly from the gate windings 14 and 15, as measured along the core member 13, the firing angles associated with the gate windings and the current passing through their respective legs 23 and 24 will be equal. The various components may be designed so that the supply voltage will bring the core member 13 just to the saturation point or will even saturate the core member somewhat when the magnet 12 is in this intermediate position. In either case, no current will be available or required to flow through the output connections between the signal point s and the reference point r, and the galvanometer 28 will indicate no current flow. The bridge-like circuit, in such an operational condition, is said to be balanced and the algebraic difference between the firing angles associated with the gate windings is zero.

When the magnet 12 is positioned asymmetrically with respect to the gate windings 14 and 15, so that it is closer to one gate winding than the other as measured along the core member 13, the balanced condition will be upset and algebraic difference between the firing angles will be different from zero, since the magnet 12 will have a greater effect on the firing angle associated with the nearer gate winding. Thus, the firing angle associated with the nearer gate winding will be either increased or decreased with respect to the firing associated with the other gate winding, depending upon the polarity of the magnet 12. Accordingly, the leg 23 or 24 of the bridge-like circuit associated with the nearer gate winding will be caused to conduct more or less current than the other leg.

The operation of the device thus described is as follows:

It will be assumed that the polarity of the magnet 12 with respect to the polarity of the reactors 14 and 15 is such as to decrease their associated firing angles and thereby increase the current flowing through their associated circuit legs 23 and 24. It will be apparent that an opposite assumption will produce a similar result. When the flow rate of fluid or liquid C through tube 11 is low so as to position the float 10 and the magnet 12 adjacent the lower end portion of the core member 13, the magnet 12 will have a greater decreasing effect on the firing angle of the gate winding 15 than on the gate winding 14. Thus, the electric current flowing through the fourth leg 24 will exceed the electric current flowing through the third leg 23 and a deficiency of current at the signal point s will cause a control or measuring current flow from the reference point r to the right of the drawing, through the galvanometer 28 to the signal point s. For reference purposes, the algebraic difference between the firing angles may be said to be negative in this condition, where the firing angle associated with the gate winding 14 exceeds the firing angle associated with the gate winding 15.

When the flow rate of fluid C in the tube 11 increases to position the float 10 and the magnet 12 adjacent an upper portion of the core 13, the magnet 12 will have a greater decreasing effect on the firing angle associated with the upper gate winding 14 than on the lower gate winding 15. Thus, electric current conducted by the third leg 23 of the bridge-like circuit will exceed the electric current conducted by the leg 24 thereof, and a current surplus will exist at the signal point s. This current surplus will flow to the left of the drawing, from the signal point s through the galvanometer 28 to the reference point r, causing a deflection of the galvanometer 28 opposite in direction to that previously considered. Due to the opposite direction of current flow, the algebraic difference between the firing angles will be positive.

It will be seen that as the flow ratet of fluid C in the tube 11 increases from a minimum to a maximum, such increase will be indicated by a maximum deflection of the galvanometer 28 in one direction, moving to a maximum deflection in the opposite direction as the algebraic difference between the firing angles goes from negative to positive.

Referring now to FIGURE 2, wherein parts corresponding to parts shown in FIGURE 1 are numbered correspondingly, there is shown a practical assembly of a rotameter with elements of a preferred form of my transducer. The rotameter may be of a type currently employed in industry which provides only limited space between the tube 11 and a protective casing or envelope 30.

It will be seen that by providing a suitably shaped core member 13, bulky gate windings 14' and 15' can be mounted outside of the protective casing 30, thereby permitting a compact installation having no electrical parts in an unprotected relationship with respect to the fluid conducting tube 11.

As shown in FIGURE 2, I prefer to employ two saturable reactor elements comprising continuous closed-loop magnetically saturable core 13' and 13" and gate windings 14', 14", 15' and 15". Core members 13' and 13" are positioned on opposite sides of the tube 11, whereby magnetic forces between the cores 13' and 13" and the magnet 12 (see FIGURE 1) in the float 10 will be nullified and therefore will not create a source of frictional error between the float 10 and the tube 11. The gate windings 14', 14", 15' and 15" can easily be incorporated into a circuit like that shown in FIGURE 1 by connecting respective upper and lower gate windings in series or parallel.

Although I have described a specific embodiment of my transducer in combination with a flow meter, it must be emphasized that my novel transducer is useful, not only with flow meters, but is useful wherever the position of a movable object is to be accurately determined and reproduced in the form of an electrical signal. For reasons previously explained in detail, my novel transducer is especially useful where the movable object to be located is completely enclosed so as to prevent direct mechanical connection therewith, such as in the case of the flow meter or rotameter described herein, or in liquid level sensing devices or hydrometers.

While the principal concept of my invention relies purely upon the cooperation of a longitudinally movable magnet with respect to a pair of effectively spaced gate windings mounted on a core member having a portion that is parallel to the path of the magnet, I have found that by shaping that portion of the core adjacent the path along its length to vary the distance between the core and adjacent portions of the path, non-linearities that may exist in the transducer can easily be eliminated. Also, if desired, the core can be suitably shaped to introduce non-linear functions, such as a logarithmic function, between the sensed parameter and the output signal.

From the foregoing description, it will be seen that I have provided a novel mechanical-electrical position transducer and fluid-condition sensing apparatus having a minimum number of moving parts and thereby being inherently rugged and insensitive to dirt or friction wear.

Furthermore, my novel apparatus will produce a substantially linear and comparatively sensitive output signal that is inherently large due to the efficient mode of operation of the saturable reactor elements employed. It will also be apparent that my novel apparatus is readily adapted to existing metering installations because of its inherent simplicity and compactability resulting from my specific core design.

Having thus described my invention, I claim:

1. Apparatus for sensing a condition of a fluid comprising,
   (A) an elongated enclosure containing the fluid;
   (B) a condition responsive element positioned within said enclosure, directly contacting the fluid, and being constructed and arranged to cooperate with said enclosure to move along a path that extends lengthwise of said enclosure to positions along said path as a function of the condition;
   (C) a magnetic flux source located within said enclosure and connected for movement with said element, said magnetic flux source having a polar axis that is oriented substantially parallel to said path;
   (D) saturable reactor means comprising,
      (1) a magnetically saturable core member having a portion extending adjacent and substantially parallel to said path, and
      (2) A pair of gate windings of similar polarity mounted on said core member adjacent effectively opposite ends of said path; and
   (E) magnetic amplifier circuitry operatively associated with said saturable reactor means and having an electrical output;
whereby the position of said magnetic flux source along said path as determined by said condition responsive element in cooperation with said enclosure, differentially affects the operation of said gate windings to control said electrical output of said magnetic amplifier circuitry to provide a signal that is a function of the condition.

2. Apparatus as defined in claim 1 further comprising:
   (F) means responsive to said electrical output for visually indicating said condition.

3. Apparatus for sensing a condition of a fluid comprising,
   (A) an elongated enclosure containing the fluid;
   (B) a condition responsive element positioned within said enclosure, directly contacting the fluid, and being constructed and arranged to cooperate with said enclosure to move along a path that extends lengthwise of said enclosure to different positions as a function of said condition;
   (C) a magnetic flux source located within said enclosure and connected for movement with said element, said magnetic flux source having a polar axis that is oriented substantially parallel to said path;
   (D) saturable reactor means comprising,
      (1) a continuous closed-loop magnetically saturable core member having one portion that extends substantially parallel to said path and is positioned within the magnetic field of said flux source and having another portion spaced further from said path than said one portion, and
      (2) a pair of gate windings mounted on said other portion of said core member, adjacent effectively opposite ends of said path; and
   (E) means responsive to the differential effect of said flux source on said gate windings for producing an electrical output signal indicative of the position of said condition responsive element along the path.

4. Apparatus for sensing a condition of fluid comprising:
   (A) an elongated enclosure containing the fluid;
   (B) a condition responsive element positioned within said enclosure, directly contacting the fluid, and being constructed and arranged to cooperate with said enclosure to move along a path that extends lengthwise of said enclosure to different positions as a function of the condition;
   (C) a magnetic flux source located within said enclosure and connected for movement with said element, said magnetic flux source having a polar axis that is oriented substantially parallel to said path;
   (D) a pair of magnetically saturable core members each having a first portion that extends substantially parallel to said path and is positioned within the magnetic field of said flux source, and having second and third portions effectively located at opposite ends of said path; and
   (E) circuit means comprising, a pair of first gate windings, each first gate winding being mounted on said second portion of different ones of said pair of core members; a pair of second gate windings, each second gate winding being mounted on said third portion of different ones of said pair of core members; electrical means for periodically simultaneously energizing said first and second gate windings to produce magnetic fields that are similarly directed with respect to said core members; and means responsive to the effect of asymmetric magnetization of said core members on said gate windings resulting from the position of said flux source along said path for operating as a function of the condition.

5. Apparatus for sensing a fluid flow rate comprising:

(A) a vertically extending upwardly-expanding-tapered flow circuit for upwardly conducting the fluid flow;

(B) a float positioned within said conduit, directly contacting the fluid, and being constructed and arranged to cooperate with said conduit to move along a path that extends lengthwise of said conduit to different positions as a function of the rate of fluid flow;

(C) a magnetic flux source located within said conduit and connected for movement with said float, said magnetic flux source having a polar axis that is oriented substantially parallel to said path;

(D) a magnetically saturable core member having a first portion that extends substantially parallel to said path and is positioned within the magnetic field of said flux source, and having second and third portions effectively located at opposite ends of said path;

(E) circuit means comprising, a first gate winding mounted on said second portion of said core member, a second gate winding mounted on said third portion of said core member, electrical means for periodically simultaneously energizing said first and second gate windings to produce magnetic fields that are similarly directed with respect to said core member; and (F) output means connected with said circuit means and responsive to asymmetric magnetization of said core member resulting from the position of said flux source along said path as determined by the rate of fluid flow in said conduit for operating as a function indicative of the fluid flow rate.

6. Apparatus for producing an electrical signal that is indicative of a fluid flow rate comprising:

(A) a vertically extending upwardly-expanding-tapered flow conduit for upwardly conducting the fluid flow;

(B) a float positioned within said conduit, directly contacting the fluid, and being constructed and arranged to cooperate with said conduit to move along a path that extends lengthwise of said conduit to different positions as a function of the rate of fluid flow;

(C) a magnetic flux source located within said conduit and connected for movement with said float, said magnetic flux source having a polar axis that is oriented substantially parallel to said path;

(D) a pair of continuous closed-loop magnetically saturable core members each having one portion that extends substantially parallel to said path and is positioned within the magnetic field of said flux source and having another portion spaced further from said path than said one portion;

(E) a pair of gate windings mounted on said other portion of each of said core members adjacent effectively opposite ends of said path; and (F) means responsive to a differential effect of said flux source on said gate windings for producing an electrical output signal indicative of the fluid flow rate.

7. Apparatus for producing an electrical signal as defined in claim 6 further comprising:

(G) means responsive to said electrical output for visually indicating said fluid flow rate.

References Cited in the file of this patent

UNITED STATES PATENTS

| 2,408,524 | Mestas | Oct. 1, 1946 |
| 2,649,568 | Felch et al. | Aug. 18, 1953 |
| 2,866,953 | Stratton | Dec. 30, 1958 |

FOREIGN PATENTS

| 655,367 | Great Britain | July 18, 1951 |
| 1,011,769 | France | Apr. 9, 1952 |